US012121994B2

United States Patent
Kotar et al.

(10) Patent No.: US 12,121,994 B2
(45) Date of Patent: Oct. 22, 2024

(54) PROCESSING MACHINE

(71) Applicant: DMG MORI CO., LTD., Yamatokoriyama (JP)

(72) Inventors: Matjaz Kotar, Yamatokoriyama (JP); Masaki Kondo, Yamatokoriyama (JP); Gideon N. Levy, Yamatokoriyama (JP); Edvard Govekar, Yamatokoriyama (JP)

(73) Assignee: DMG MORI CO., LTD., Yamatokoriyama (JP)

( * ) Notice: Subject to any disclaimer, the term of this patent is extended or adjusted under 35 U.S.C. 154(b) by 521 days.

(21) Appl. No.: 17/598,065

(22) PCT Filed: Mar. 29, 2019

(86) PCT No.: PCT/JP2019/014249
§ 371 (c)(1),
(2) Date: Sep. 24, 2021

(87) PCT Pub. No.: WO2020/202342
PCT Pub. Date: Oct. 8, 2020

(65) Prior Publication Data
US 2022/0226931 A1    Jul. 21, 2022

(51) Int. Cl.
*B23K 26/342* (2014.01)
*B23K 26/03* (2006.01)
(Continued)

(52) U.S. Cl.
CPC .......... *B23K 26/342* (2015.10); *B23K 26/032* (2013.01); *B23K 26/034* (2013.01);
(Continued)

(58) Field of Classification Search
CPC .. B23K 26/342; B23K 26/032; B23K 26/034; B23K 26/0734; B23K 26/0869;
(Continued)

(56) References Cited

U.S. PATENT DOCUMENTS

2002/0017509 A1    2/2002    Ishide et al.

FOREIGN PATENT DOCUMENTS

JP    2002-59286 A    2/2002

OTHER PUBLICATIONS

International Search Report issued on Jun. 4, 2019 in PCT/JP2019/014249 filed on Mar. 29, 2019, 2 pages.
(Continued)

*Primary Examiner* — Robert G Bachner
(74) *Attorney, Agent, or Firm* — Oblon, McClelland, Maier & Neustadt, L.L.P.

(57) ABSTRACT

A processing machine includes a laser irradiation device that emits an annular laser beam, and a wire feeding device that feeds a wire from an inside of the annular laser beam. When a workpiece irradiation proportion parameter (WIP) represented by an equation $WIP=P_{wp}/P$ ($P_{wp}$: laser beam power introduced onto a workpiece surface when the wire exists in an irradiation region of the laser beam, P: the laser beam power introduced onto the workpiece surface when the wire does not exist in the irradiation region) is defined, a control device controls the wire feeding device so that a wire end abuts on the workpiece surface at a beginning of additive manufacturing. The control device determines initial power $P_0$ based on the WIP at the beginning of the additive manufacturing, and controls the laser irradiation device so that the workpiece is irradiated with the laser beam at the initial power $P_0$.

6 Claims, 13 Drawing Sheets

(51) Int. Cl.
   *B23K 26/073* (2006.01)
   *B23K 26/08* (2014.01)
   *B23K 26/70* (2014.01)
   *B33Y 30/00* (2015.01)
(52) U.S. Cl.
   CPC ...... *B23K 26/0734* (2013.01); *B23K 26/0869* (2013.01); *B23K 26/702* (2015.10); *B33Y 30/00* (2014.12)
(58) Field of Classification Search
   CPC ................ B23K 26/702; B23K 26/123; B23K 26/1462; B23K 26/24; B33Y 30/00; Y02P 10/25
   See application file for complete search history.

(56) References Cited

OTHER PUBLICATIONS

Kotar et al., "Initial Transient Phase and Stability of Annular Laser Beam Direct Wire Deposition", CIRP Annals—Manufacturing Technology, 2019, vol. 68, pp. 233-236.

$h_{wp}$=4.5mm

WIP=79%

FIG.15
| POLICY | PARAMETER | | | | | | |
|---|---|---|---|---|---|---|---|
| | $P_m$(kW) | $P_0$(kW) | $P_s$(kW) | $t_{mp}$(s) | $t_{mb}$(s) | $\Delta t_t$(s) | $t_s$(s) |
| A | – | 0.5 | 2.0 | 1.1 | 2.0 | 0.2 | 2.58 |
| B | 1.3 | 0.5 | 2.0 | 0.3 | 1.2 | 0.2 | 1.47 |
| C | – | 0.5 | 2.0 | – | 0.3 | 0.2 | 0.80 |
FIG.16
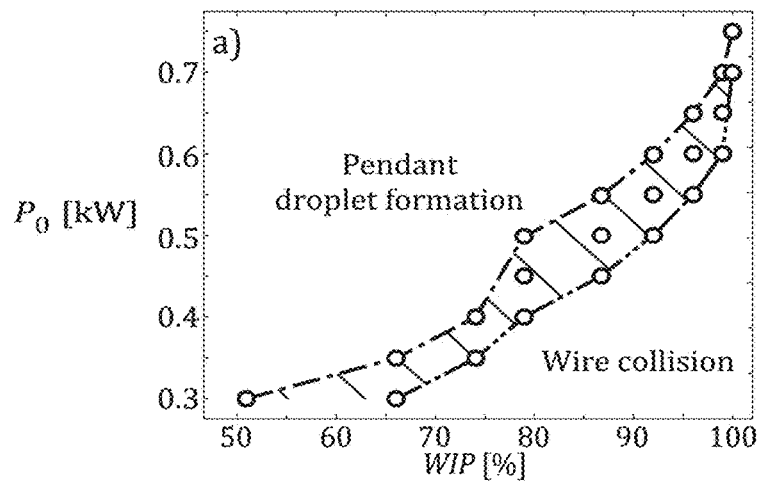
FIG.17
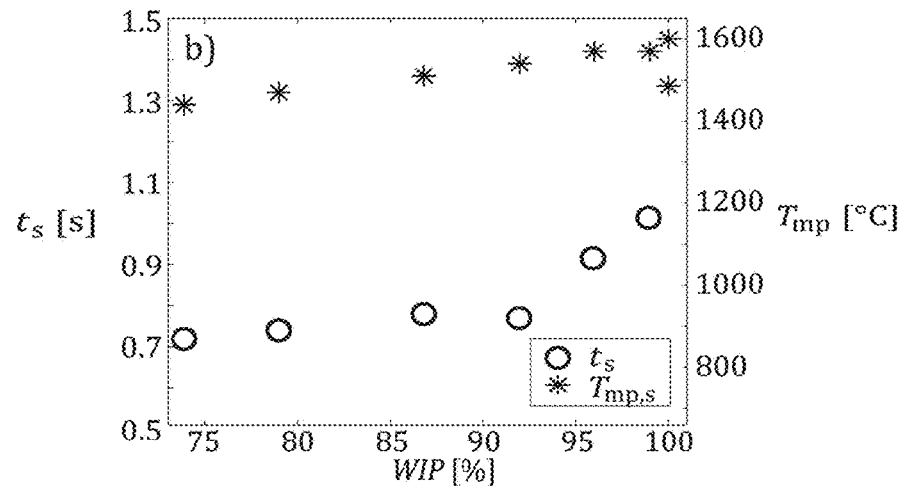

PROCESSING MACHINE

TECHNICAL FIELD

The present invention relates to a processing machine.

BACKGROUND ART

For example, JP 2002-59286A (PTL 1) discloses a laser processing device that performs laser welding by irradiating a portion to be welded with laser light while a wire is supplied to the portion to be welded.

CITATION LIST

Patent Literature

PTL 1: Japanese Patent Laying-Open No. 2002-59286

SUMMARY OF INVENTION

Technical Problem

Laser direct metal deposition (L-DMD) is a process of additive manufacturing (AM) in which a powdered or wire-like metal is directed by a nozzle into a molten pool generated on a metal surface by a laser beam. The L-DMD process may be used in various AM applications including 3D printing, coating, and 3D part repair.

Choice of a material form depends on application, and introduces several specific advantages and disadvantages. The main advantage of the use of the powder is high process stability and robustness, and is selection of a wide range of materials and ability to mix several material powders in order to create alloy and a graded material part. On the other hand, the use of the wire as compared to the powders offers the advantages including low price of a wire material, high material use efficiency and a deposition rate, and no problem like handling safety and environmental pollution. The use of the powder may be harmful to both a human and a machine. In addition, due to an oxidation issue, the wire material is easy to store and is applied to the deposition of a reactive material such as Al and a Ti alloy.

In order to perform laser direct wire deposition (L-DWD), in the simplest case, a deposition head is used by means in which the wire is laterally fed into the molten pool generated by the laser beam directed orthogonally to a workpiece surface. In this case, the efficiency and stability of the process is influenced by an angle of lateral feed and can be either from a front, a back, or a side of the generated molten pool. One of major drawbacks of the lateral feeds is asymmetry of the process and dependency of an involved direction, which can be partially solved by an L-DWD head with different feed directions.

Another approach to achieve symmetry of the L-DWD process, the direction independence, and the high process stability is to axially feed the wire relative to the laser beam. This may be achieved by a number of laser beams located around the axially fed wire, or an annular laser beam. Despite several advantages and improvements achieved by the wire feeding in the axial direction, the stability of the L-DWD process indicates high sensitivity to a parameter of the process, particularly in an initial transition phase.

An object of the present invention is to solve the above problems, and to provide a processing machine that achieves the high process stability in annular laser beam direct wire deposition (ALB-DWD).

Solution to Problem

A processing machine according to the present invention is a processing machine that performs additive manufacturing. The processing machine includes: a laser irradiation device configured to irradiate a workpiece with an annular laser beam; a wire feeding device configured to feed a wire from an inside of the annular laser beam emitted from the laser irradiation device toward the workpiece; and a control device configured to control the processing machine. A workpiece irradiation proportion parameter (WIP) represented by the following equation is defined.

$$WIP = P_{wp}/P$$

($P_{wp}$: laser beam power introduced onto the workpiece surface when the wire exists in an irradiation region of the laser beam)

(P: laser beam power introduced onto the workpiece surface when the wire does not exist in the irradiation region of the laser beam)

In this case, at a beginning of the additive manufacturing, the control device controls the wire feeding device so that a wire end abuts on the workpiece surface. At a beginning of the additive manufacturing, the control device determines initial power $P_0$ of the laser beam based on the WIP, and controls the laser irradiation device so that the workpiece is irradiated with the laser beam at the initial power $P_0$.

According to the processing machine configured as described above, when the wire end abuts on the workpiece surface at the beginning of the additive manufacturing, the workpiece is irradiated with the laser beam at the initial power $P_0$ determined based on the WIP, whereby a molten bond in an appropriate form can be formed between the workpiece surface and the wire end. At the beginning of the additive manufacturing, the workpiece and the wire are simultaneously heated by the laser beam by abutting the wire end on the workpiece surface. For this reason, the melt pool on the workpiece surface and the molten bond between the workpiece surface and the wire end can be generated in a short time. Accordingly, according to the present invention, the process stability can be enhanced in the initial phase at the beginning of the additive manufacturing.

Preferably, the control device includes: a storage configured to store data related to a relationship between the WIP and the initial power $P_0$ of the laser beam to be set; a controller configured to determine the initial power $P_0$ of the laser beam by comparing the WIP at the beginning of the additive manufacturing to the data stored in the storage; and a communicator configured to communicate the initial power $P_0$ of the laser beam determined by the controller to the laser irradiation device.

According to the processing machine configured as described above, the initial power $P_0$ of the laser beam can be appropriately determined according to the value of the WIP at the beginning of the additive manufacturing.

Preferably, the processing machine further includes an infrared camera configured to observe the workpiece surface. The controller specifies the WIP by estimating the laser beam power introduced onto the workpiece surface from a pixel value of an infrared image obtained by the infrared camera.

According to the processing machine configured as described above, the WIP at the beginning of the additive manufacturing can be easily specified using the pixel value of the infrared image obtained by the infrared camera.

Preferably, the control device controls the laser irradiation device so that the power of the laser beam increases to power $P_S$ larger than the initial power $P_0$ after the irradiation of the laser beam is continued for a certain period of time with the initial power $P_0$.

Preferably, the control device controls the wire feeding device so that wire feeding is started toward the workpiece at an identical time when the power of the laser beam starts the increase from the initial power $P_0$.

Preferably, the machining apparatus further includes a moving mechanism configured to move the laser irradiation device and the workpiece relative to each other. The control device controls the moving mechanism unit so that the laser irradiation device and the workpiece start to move relative to each other while the power of the laser beam increases from the initial power $P_0$ to the power $P_S$.

According to the processing machine configured as described above, the process can be stably transitioned from the initial phase at the beginning of the additive manufacturing to the steady phase in which the additive manufacturing is continuously performed on the workpiece.

Advantageous Effects of Invention

As described above, according to the present invention, the processing machine that achieves the high process stability in the ALB-DWD can be provided.

BRIEF DESCRIPTION OF DRAWINGS

FIG. 15 is a table illustrating a process parameter and characteristic time in the policy A, the policy B, and the policy C.

FIG. 16 is a graph illustrating dependence of initial laser beam power $P_0$ on the WIP.

FIG. 17 is a graph illustrating treatment time $t_s$ and a related melt pool temperature $T_{mp,s}$.

DESCRIPTION OF EMBODIMENTS

Figure 1:
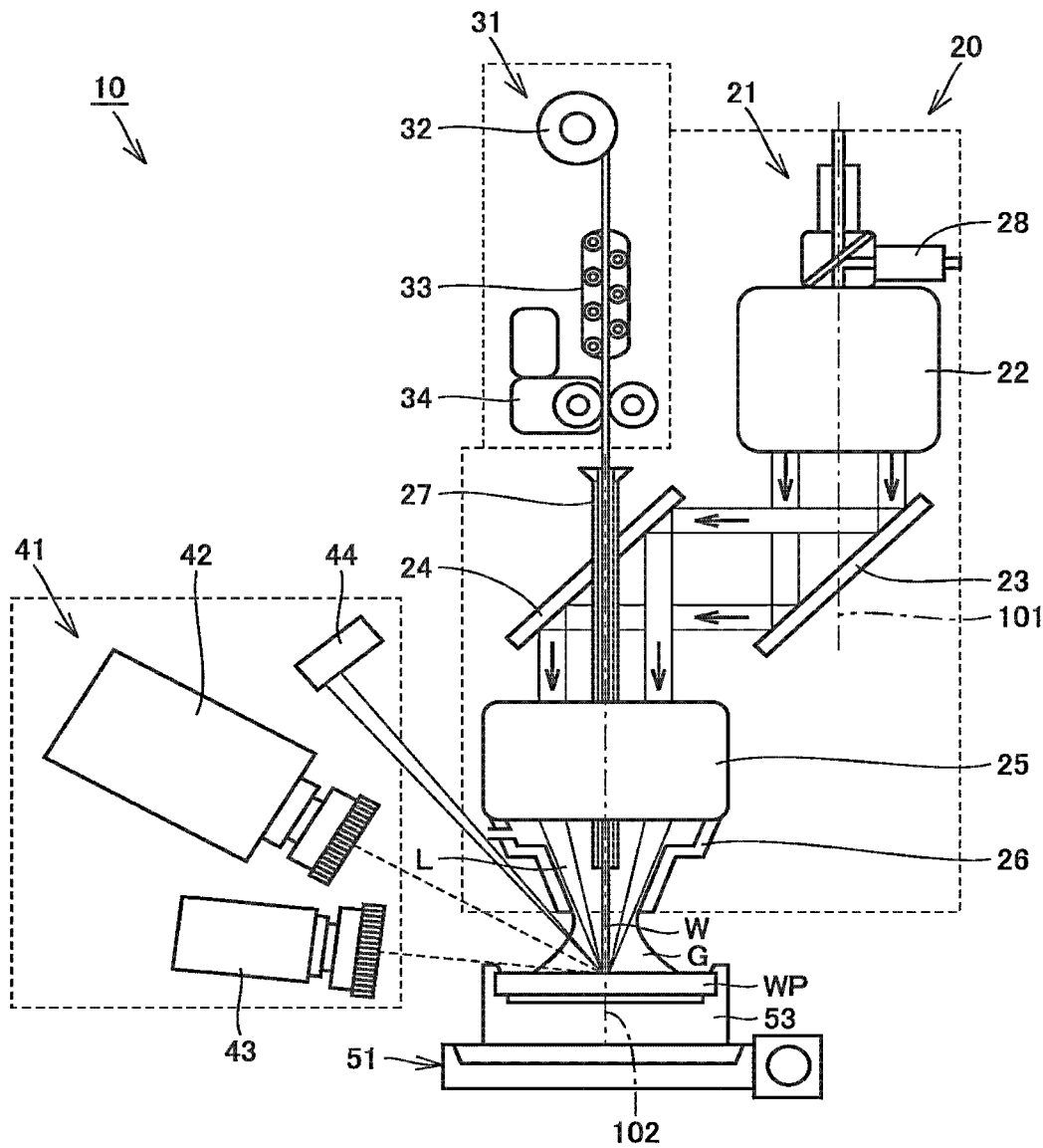
FIG. 1 is a diagram illustrating a setup of an annular laser beam direct wire deposition (ALB-DWD).

An embodiment of the present invention will be described with reference to the drawings. In the drawings referred to below, the same or corresponding member is denoted by the same reference numeral.

Investigation of Initial Transition Phase and Stability of Annular Laser Beam Direct Wire Deposition (ALB-DWD)

Setup and Workpiece Irradiation Proportion Parameter (WIP) of Annular Laser Beam Wire Deposition FIG. 1 is a diagram illustrating a setup of the ALB-DWD. The setup for the ALB-DWD is schematically illustrated in FIG. 1. The setup includes an ALB-DWD head 20, a wire feeding device 31, a workpiece moving stage 51, a process monitoring system 41 and a continuous 2.5-kW, 1080-nm-wavelength fiber laser source (not illustrated).

In ALB-DWD head 20, collimated laser beam is transformed into an annular laser beam (ALB) by a beam forming unit 22. The ALB is guided coaxially with an axis of a wire guide tube 27 by two reflection mirrors 23, 24 and focused on a workpiece surface by a focusing optical component 25. A metal wire is axially fed to a center of the annular laser beam using wire feeding device 31 including a wire straightener 33, a wire feeder 34, and a wire guide tube 27.

A co-axial gas nozzle 26 is used to convey Ar shielding gas in a melt pool and around a wire deposition zone on the surface of the workpiece clamped the workpiece moving stage (horizontal moving stage) 51.

A workpiece standoff position (WSP) with respect to an ALB focal position is determined using a laser distance sensor 44, the WSP being represented by $h_{wp}$. A high-speed CMOS vision camera 43 and a two-color in-axis pyrometer 28 are used to perform visualization of a DWD process and monitoring of a melt pool temperature. An infrared camera (IR) 42 is used for an ALB profile and WIP characterization.

Figure 2:
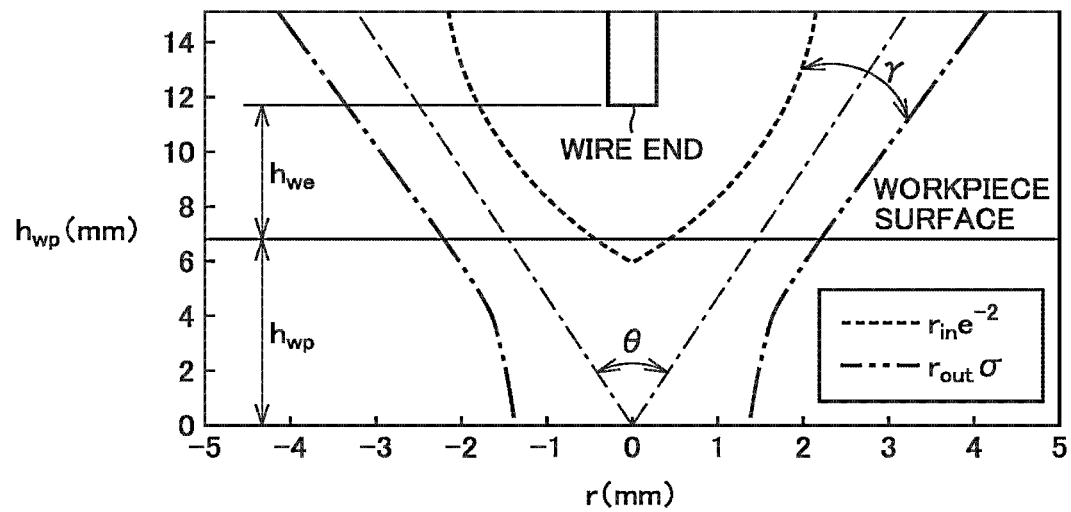
FIG. 2 is a diagram illustrating a profile of an annular laser beam (ALB).
Figure 3:
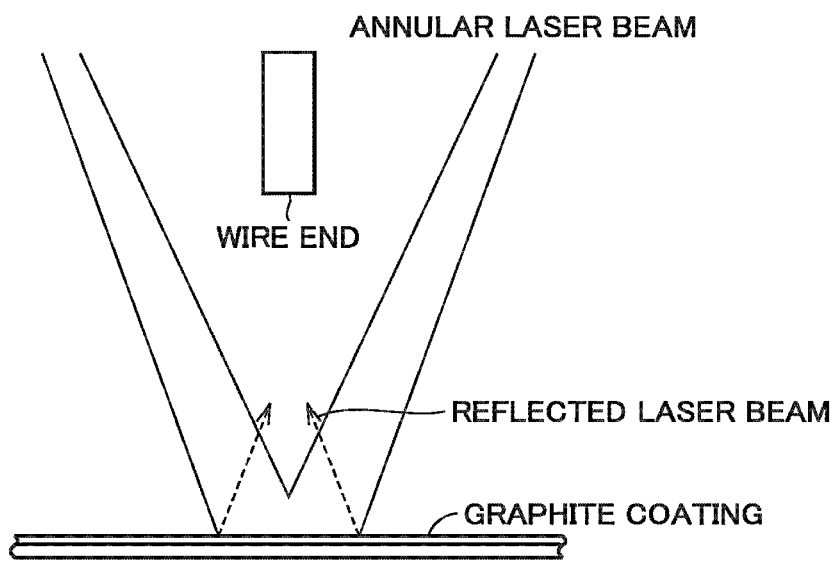
FIG. 3 is a diagram illustrating an initial wire end position (without wire) for a workpiece irradiation proportion parameter (WIP) measurement and an initial process phase policy.
Figure 4:
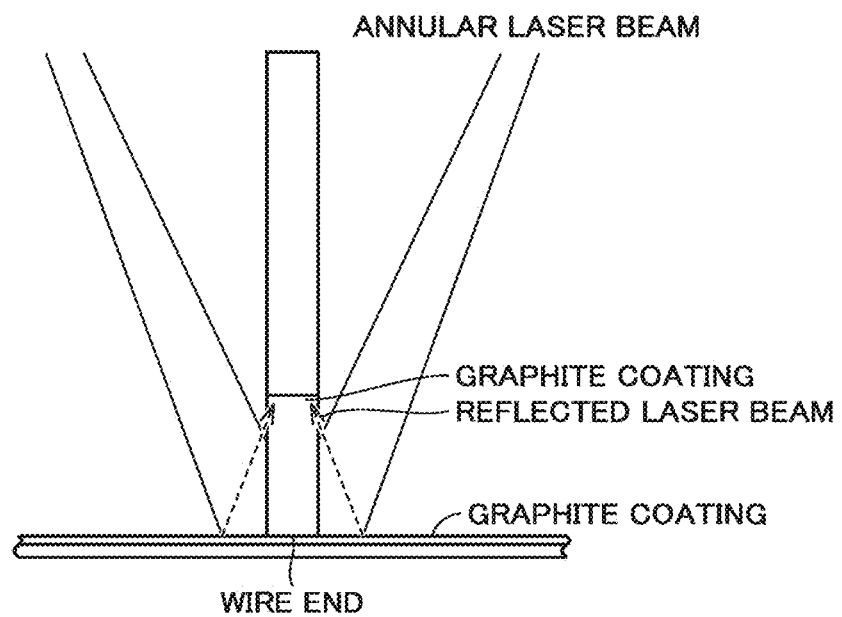
FIG. 4 is a diagram illustrating the initial wire end position (with wires) for the WIP measurement and the initial process phase policy.

FIG. 2 is a diagram illustrating an ALB profile (caustic). FIG. 3 is a diagram illustrating an initial wire end position (without wire) for WIP measurement and an initial process phase policy. FIG. 4 is a diagram illustrating the initial wire end position (with wires) for the WIP measurement and the initial process phase policy.

Figure 5:
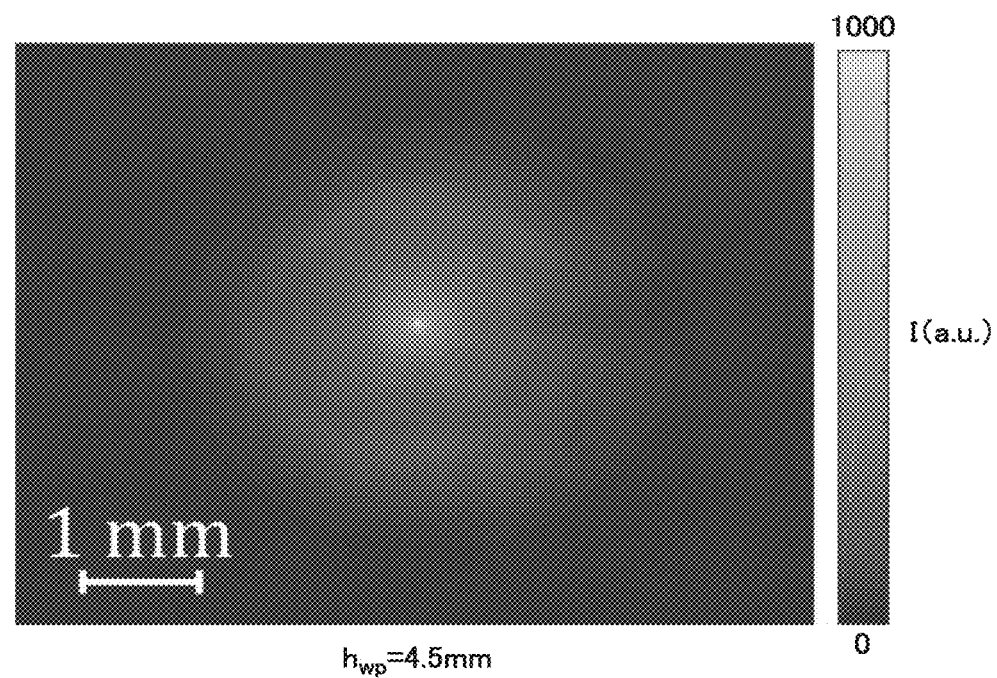
FIG. 5 is a diagram illustrating a laser pulse thermal footprint I and related $I_a$ at $h_{wp}$=4.5 mm.
Figure 6:
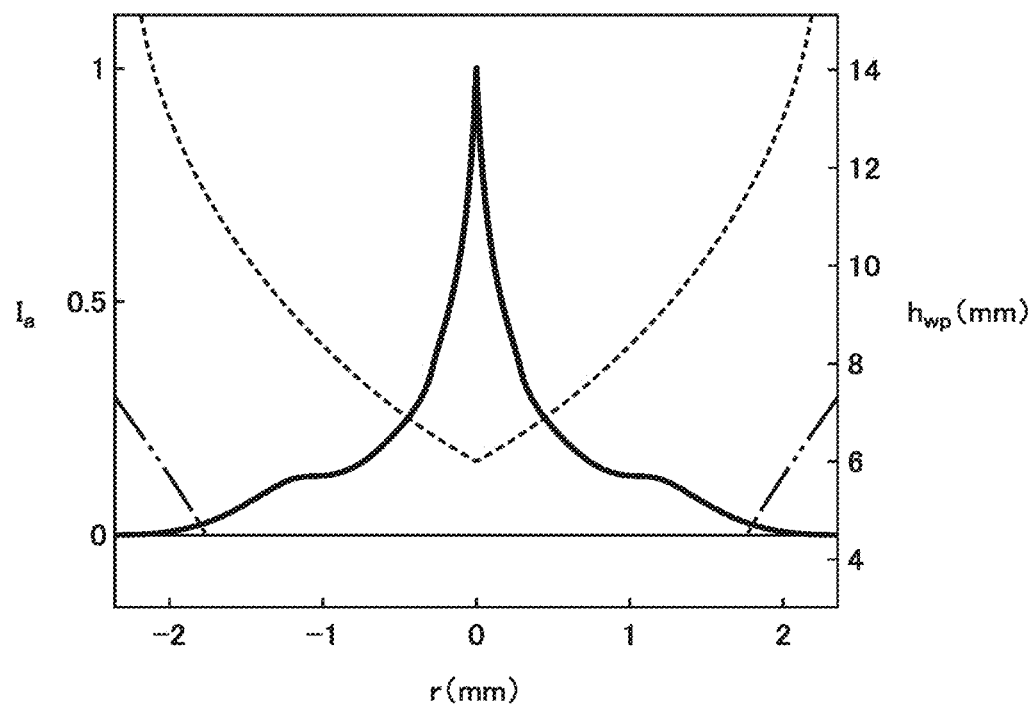
FIG. 6 is a diagram illustrating the laser pulse thermal footprint I and related $I_a$ at $h_{wp}$=4.5 mm.
Figure 7:
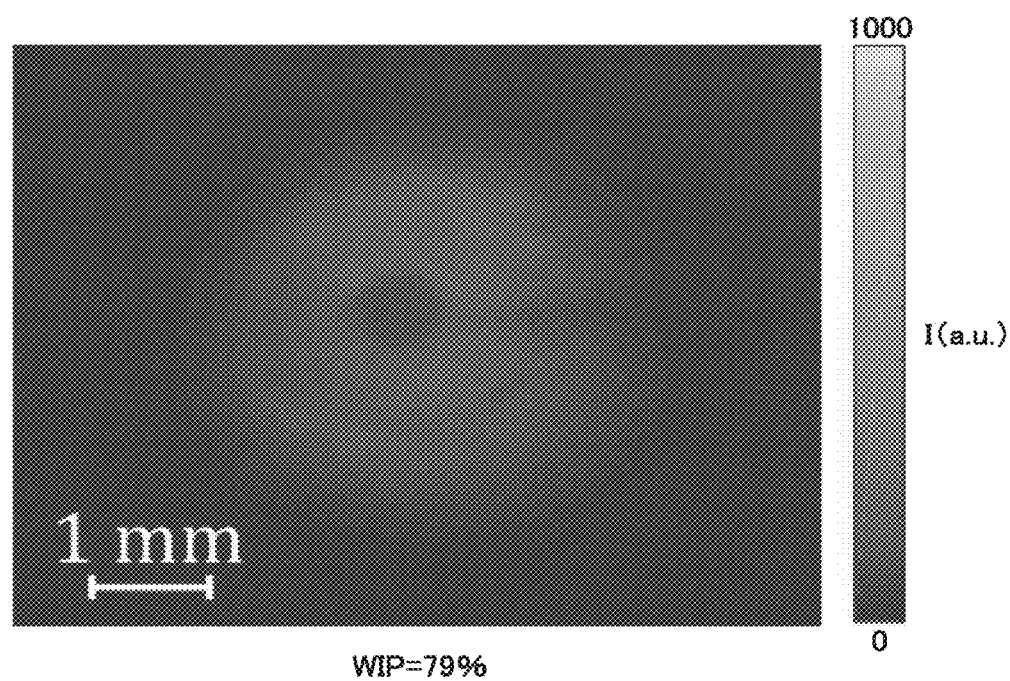
FIG. 7 is a diagram illustrating a laser pulse thermal footprint $I_{wp}$ and related $I_{a,wp}$ at $h_{wp}$=4.5 mm and WIP 79%.
Figure 8:
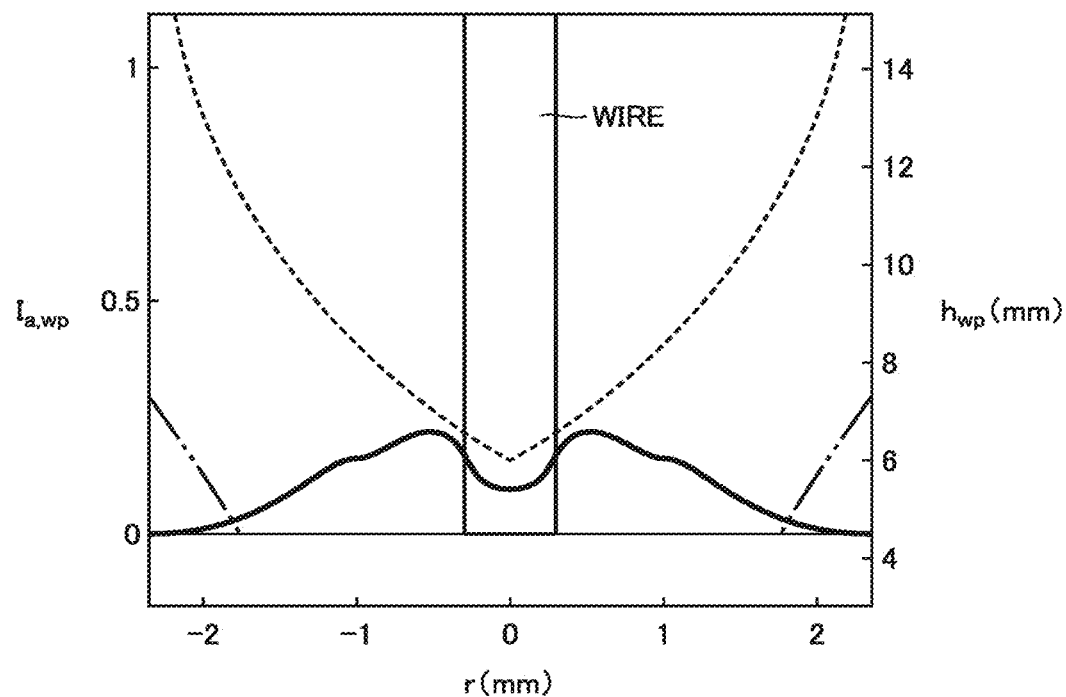
FIG. 8 is a diagram illustrating the laser pulse thermal footprint $I_{wp}$ and related $I_{a,wp}$ at $h_{wp}$=4.5 mm and WIP 79%.

FIGS. 5 and 6 are diagrams illustrating a laser pulse thermal footprint I and related $I_a$ at $h_{wp}$=4.5 mm. FIGS. 7 and 8 are diagrams illustrating a laser pulse thermal footprint $I_{wp}$ and related $I_{a,wp}$ at $h_{wp}$=4.5 mm and WIP=79%.

FIG. 2 illustrates an example of an experimentally obtained ALB profile above a focal position, the experimentally obtained ALB profile with convergence θ=15° and a wedge angle γ=1.7° is applied to a direct wire deposition (DWD) process. A dotted line and a two-dot chain line represent the boundaries of laser beam intensity $I_{Tb}$ at an inside $1/e^2$ and an outside D4σ.

The boundaries are estimated from laser pulse thermal footprint intensity on a thin graphite layer, and measured by an IR camera at different WSPs where the wire does not exist at a focal point of the ALB as illustrated in FIG. 3. FIGS. 5 and 6 illustrate footprint intensity I measured at $WSP_{h_{wp}}=4.5$ mm and a related laser beam intensity profile $1_a(r)$ averaged along 360°.

As illustrated schematically in FIG. 4, when the wire exists, simultaneous irradiation and heating of the wire and the workpiece surface may be achieved in line symmetry. In general, a rate of irradiation of the workpiece and the wire depends on the ALB profile, the WSP, and the initial wire-end position indicated by $h_{we}$ in FIG. 2.

FIGS. 7 and 8 illustrate an example of a distribution of the laser beam thermal footprint intensity $I_{wp}$ and related laser beam intensity profile $I_{a,wp}(r)$ averaged along 360°, which are measured at the WSP where a graphite-coated wire end exists at $h_{wp}=4.5$ mm and $h_{we}=0.0$ mm. By the simultaneous laser beam irradiation of the workpiece and wire end, lower intensity $I_{wp}$ and lower energy input to the workpiece surface are achieved.

In order to characterize the power of the laser beam irradiation of the workpiece and the ratio of the related energy input, the WIP (Workpiece irradiation proportion parameter) is defined by the following equation (1).

[Mathematical Formula 1]

$$WIP = \frac{P_{wp}}{P} = \frac{\int_0^{r_b} I_{a,wp}(r) 2\pi r dr}{\int_0^{r_b} I_a(r) 2\pi r dr} \cdot 100\% \quad (1)$$

At this point, $P_{wp}$ and P represent the ratio of the laser beam power introduced onto the workpiece surface when the wire exists at the ALB focal point and when the wire does not exist at the ALB focal point. $P_{wp}$ and P may be calculated by integration of $T_{a,wp}(r)$ and $I_a(r)$ as defined in the second term of equation (1). In this case, $P_{wp}$ and P are estimated by summing pixel values of a related IR image of the laser pulse thermal footprint intensities $I_{wp}$ and I. In this case, this gives WIP=79%. Based on the specified WIP, the ratio of the laser power P used for heating the wire end is defined as 1−WIP.

(Initial Transition Phase and Process Stability)

Figure 9:
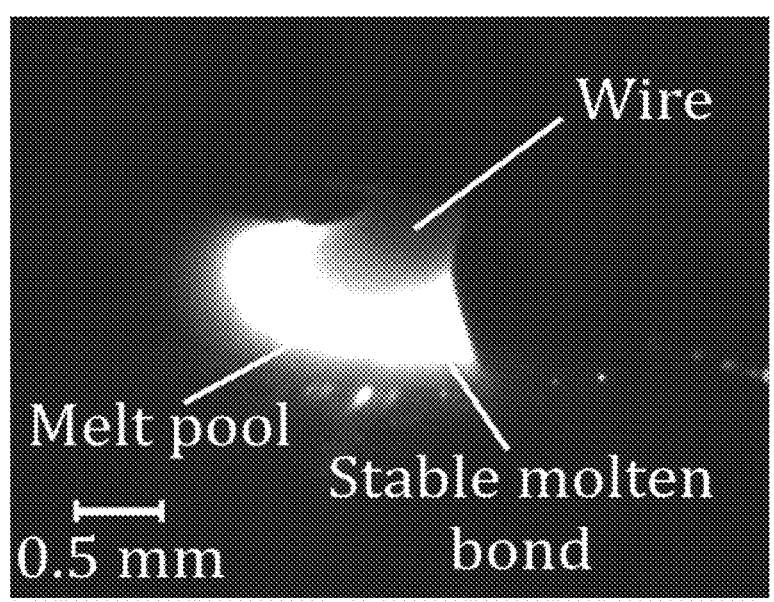
FIG. 9 is a diagram illustrating a molten bond formed between a workpiece surface and a wire.
Figure 10:
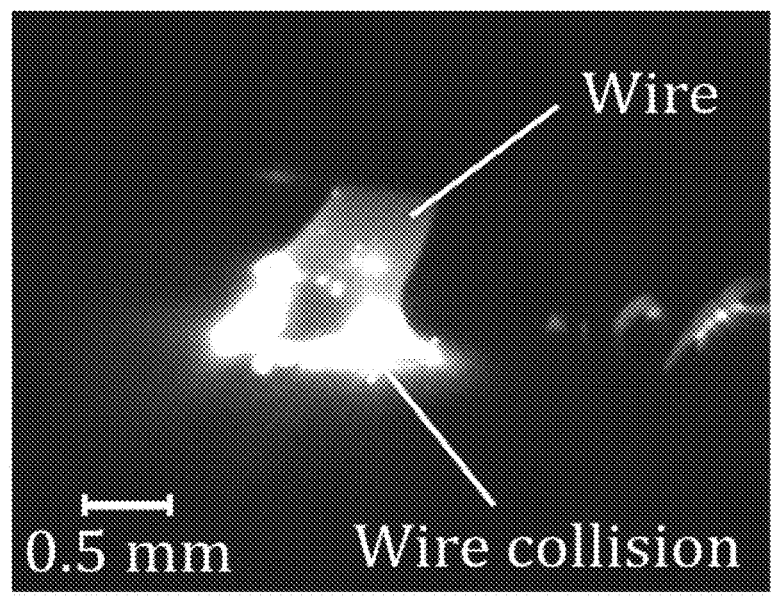
FIG. 10 is a diagram illustrating wire collision.
Figure 11:
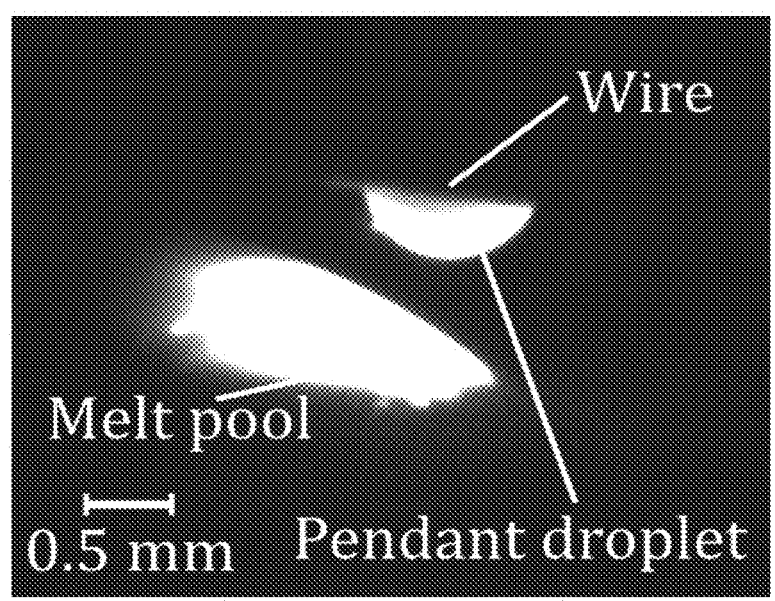
FIG. 11 is a diagram illustrating a pendant droplet.

FIG. 9 is a diagram illustrating a molten bond formed between the workpiece surface and the wire. FIG. 10 is a diagram illustrating wire collision. FIG. 11 is a diagram illustrating a pendant droplet.

A laser DWD process is considered stable as long as a bond initially established between a melt pool and the fed wire end (FIG. 9) persists along an entire deposition path. This is achieved by proper energy input in space and time, and requires precise time synchronization of time depending on laser beam power, wire feed and workpiece scan speed.

In general, process instability due to improper energy input causes either a non-molten wire end and a workpiece surface collision (FIG. 10) or a pendent droplet (FIG. 11), and both results in unsuccessful formation or destruction of the previously established molten bond. The latter is particularly important during the initial transition phase of the DWD process and is essential for further stability and steadiness of the process.

Figure 12:
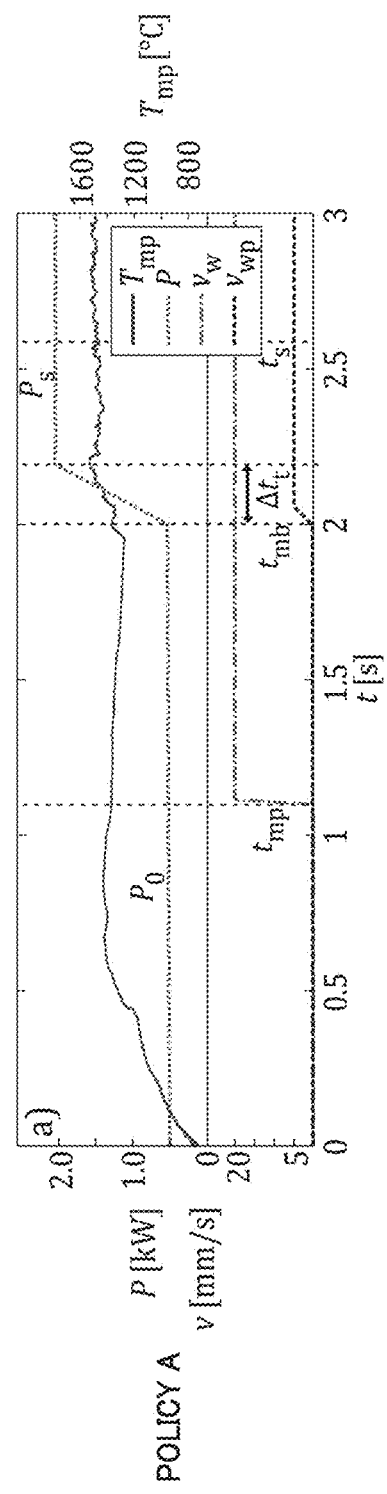
FIG. 12 is a graph illustrating a policy A of an initial phase of the ALB-DWD.
Figure 13:
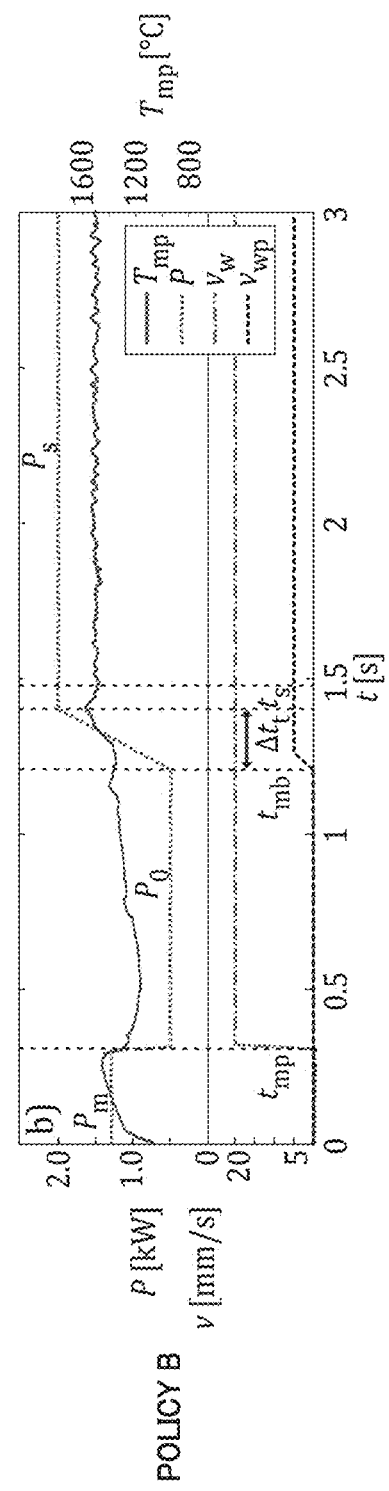
FIG. 13 is a graph illustrating a policy B of the initial phase of the ALB-DWD.
Figure 14:
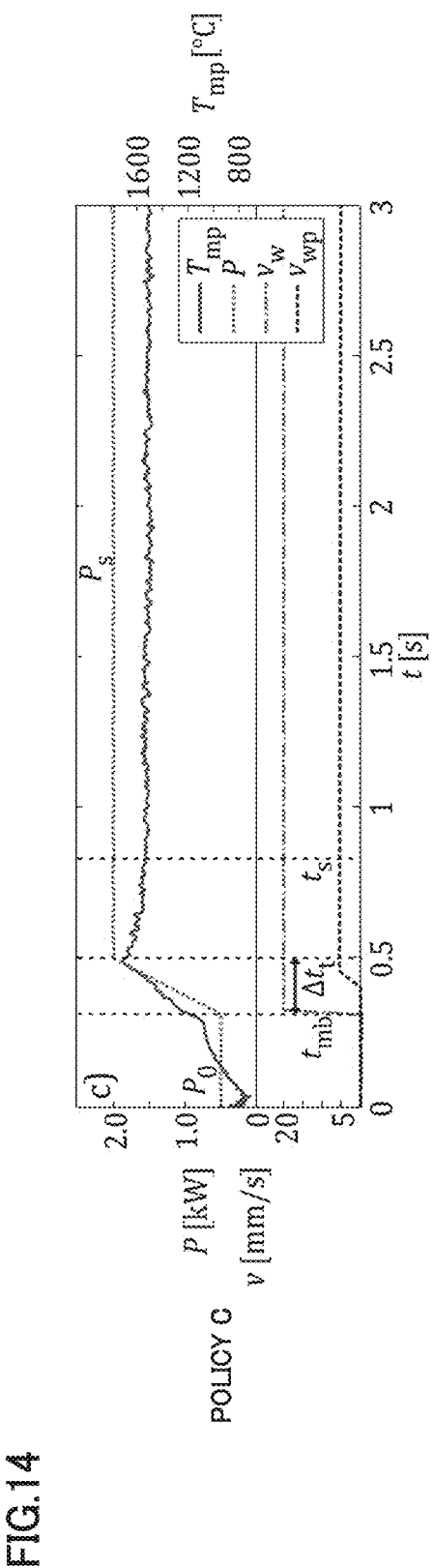
FIG. 14 is a graph illustrating a policy C of the initial phase of the ALB-DWD.

FIG. 12 is a graph illustrating a policy A of an initial phase of the ALB-DWD. FIG. 13 is a graph illustrating a policy B of the initial phase of the ALB-DWD. FIG. 14 is a graph illustrating a policy C of the initial phase of the ALB-DWD.

FIG. 15 is a table illustrating process parameters and characteristic time in policy A, policy B, and policy C.

The following three different initial phase policies take into account two possible initial wire end positions. Specifically, above the workpiece surface, $h_{we}>0.0$ mm, and on the workpiece surface, $h_{we}=0.0$ mm are considered and compared. In the experiment, an SS316 wire having a diameter of 0.6 mm and an SS304 workpiece having a dimension of [w×l×h]=[25×60×10] mm are used.

FIGS. 12 to 14 illustrate preset laser beam power P (t), wire feeding speed $v_w(t)$, workpiece feeding speed $v_{wp}(t)$, and measured melt pool temperature $T_{mp}(t)$ for three proposed initial phase policies performed at WIP=92%.

The first two examples belong to two considered initial policies A and B with $h_{we}>0.0$ mm. The advantage of these two policies is that the melt pool can be generated without blocking the laser beam by the wire and reducing the power.

However, the laser beam reflected from the workpiece surface can then lead to uncontrollability of the irradiation of the wire end by the direct laser beam. An initial laser beam power $P_0$ that is too high or too low may result in either uncontrolled formation of the pendant droplet from the wire end or collision of the wire end and the workpiece surface.

In order to solve this problem, the initial wire end position should be above the position of the reflected laser beam focal point as illustrated in FIG. 3. In addition, in order to form the melt pool and the molten bond, policy A should use the lower laser beam power $P_0$ at a beginning of a longer period $t_{mb}$ as illustrated in FIG. 12, or policy B should reduce the laser beam at the higher initial power $P_m$ to $P_0$ at a time $t_{mp}$ corresponding to a moment of the melt pool formation as illustrated in FIG. 13.

At time $t_{mp}$, the wire feeding at the preset feeding speed $v_w$ and the pre-heating of the wire end are taken place until $t_{mb}$ when the molten bond is established between the wire end and the workpiece surface. At the time $t_{mb}$ of the molten bond formation, the workpiece feeding starts at preset feeding speed $v_{wp}$, and the laser beam power P is linearly increased to $P_s$ within a time of $\Delta t$ at the same time.

In this respect, high and sufficient energy input is achieved to maintain the established molten bond and ensure a smooth transition of the process to a steady phase. The latter is clear from a time course of temperature $T_{mp}$ measured in the melt pool process, and both the cases settle to around $T_{mp,s}=1530°$ C. at time $t_s$.

The values and the relationship of the process parameters $P_0$, $P_m$, $P_s$, $v_w$, $v_{wp}$, the characteristic times $t_{mp}$, $t_{mb}$, and $\Delta t_t$ are mutually dependent on each other, and are complex due to the fed wire end and the laser beam interacting with the workpiece surface.

In the considered example of FIGS. 12 and 13, for preset wire feeding speed $v_w=20$ mm/s and workpiece feeding speed $v_{wp}=5$ mm/s, the values of $P_0$, $P_m$, $P_s$ and $t_{mp}$, $t_{mb}$, $\Delta t_t$ are experimentally obtained by analysis of a record of a process visualization and given in FIG. 15. In policy B, the characteristic times $t_{mp}$, $t_{mb}$ and related $t_s$ of the transition to the steady phase are shorter due to higher initial laser power $P_m=1.3$ kW.

In order to overcome the above drawbacks related to the initial position of the wire end above the workpiece surface, initial phase policy C in which the wire end is placed on the workpiece surface is proposed as illustrated schematically in FIG. 4. In this case, both the workpiece surface and the wire end are simultaneously heated by the laser beam at power $P_0$ at the preset ratio defined by WIP=92% for the time interval $(0, t_{mb})$ required for the establishment of the molten bond. With respect to the previous two policies, in this case, the workpiece and the wire are simultaneously heated, whereby the melt pool and the molten bond are simultaneously generated during the time $t_{mb}$ when the laser power $P_0$ is applied.

As illustrated in FIG. 14, after the moment $t_{mb}$ of the establishment of the initial molten bond, the laser beam power $P_0$ is linearly increased to $P_s$ and the wire feed is initiated to prevent interference with the molten bond due to the formation of the pendant droplet. Furthermore, in order to ensure the sufficient energy for the formation of the well-formed molten bond, the feeding of the workpiece is initiated with a slight delay during the linear increase of the laser beam power. This ensures the transition of the process to the steady phase. The significantly earlier transition from the time course of melt pool temperature $T_{mp}$ to the steady process phase may be observed at time $t_s$=0.80 s.

FIG. 16 is a graph illustrating dependence of initial laser beam power $P_0$ on the WIP. FIG. 17 is a graph illustrating treatment time $t_s$ and a related melt pool temperature $T_{mp,s}$.

For the previous two policies, it is experimentally observed that in this case, the value of laser beam power $P_0$ depends only on the WIP, and that in the stable stationary phase, the laser beam power depends on feeding speeds $v_w$ and $v_{wp}$ in addition to WIP.

At different $P_0$ and $P_s$, characteristic time $t_{mb}$ and $\Delta t_t$ are kept constant, and indicate high process robustness. The laser beam power $P_0$ in FIG. 16 and the relationship between processing time $t_s$ and related temperature $T_{mp,s}$ and the WIP in FIG. 17 are illustrated at $P_s$=1.8 kW. It can be seen that the larger beam diameter and lower energy input to the wire end, together with the increasing WIP, increase non-linearly related laser beam power $P_0$ required to establish the molten bond at time $t_{mb}$=0.3 s. Similarly, with increasing WIP, process time $t_s$ increases non-linearly from 0.72 s to 1.33 s and related steady melt pool temperature $T_{mp,s}$ increases linearly at intervals of 1490° C. to 1590° C.

(Window of Process Stability)

Figure 18:
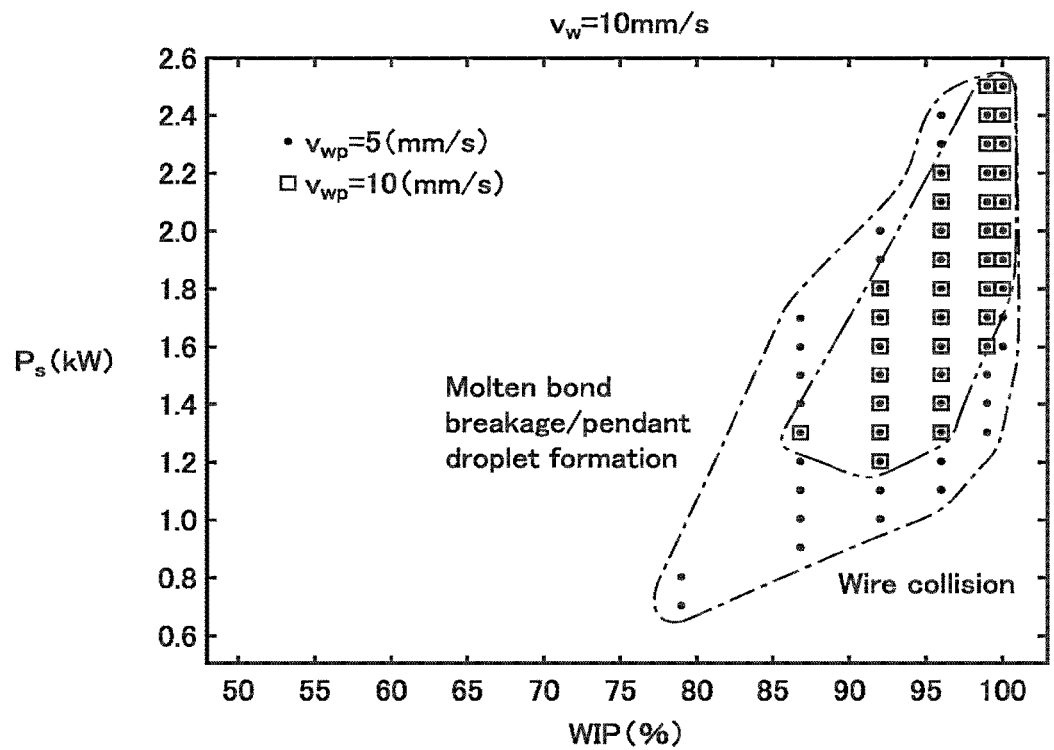
FIG. 18 is a diagram illustrating stability of a process at a wire feeding speed $v_w$=10 mm/s.
Figure 19:
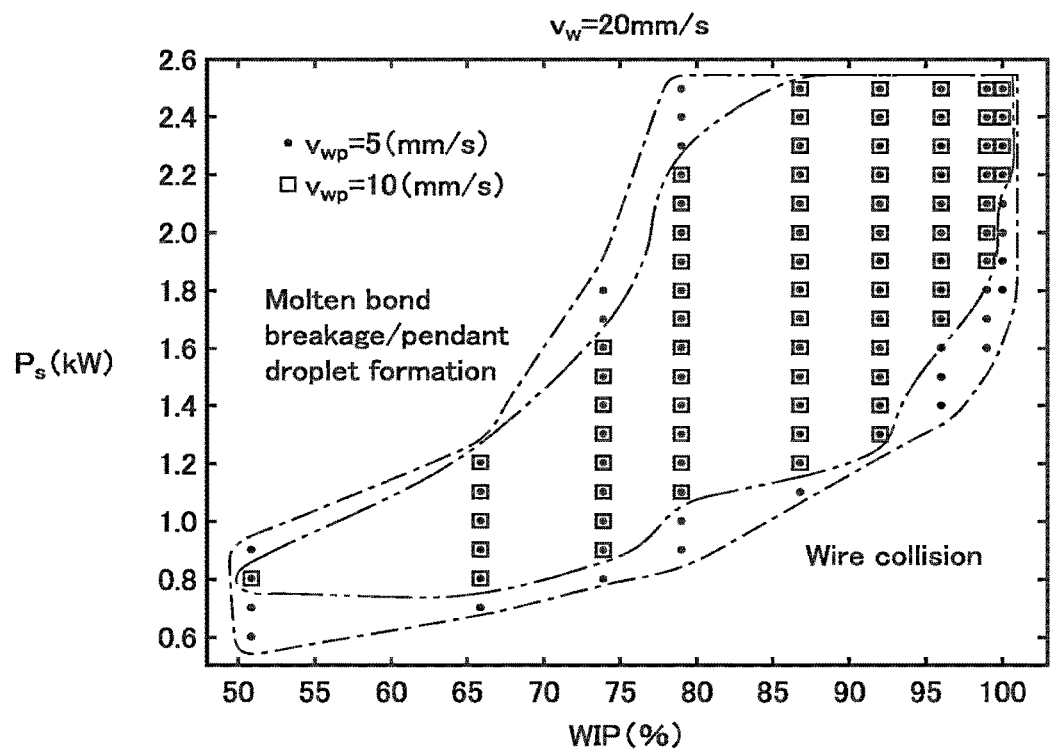
FIG. 19 is a diagram illustrating the stability of the process at the wire feeding speed $v_w$=20 mm/s.

FIG. 18 is a graph illustrating the process stability at wire feeding speed $v_w$=10 mm/s. FIG. 19 is a graph illustrating the process stability at wire feeding speed $v_w$=20 mm/s.

In the subsequent result of the stability analysis of the ALB-DWD process, the use of policy C, specifically, an initial position where the wire end is placed on the workpiece surface, and an emphasis on the influence of laser beam power $P_s$ on the WIP and the steady process phase is put. For this purpose, a vast set of the experiment of single layer deposition of the SS304 workpiece having the 0.6-mm diameter on the SS316 wire is performed at different wire and workpiece feeding speeds while the WIP value is varied in the range of 40% to 100%. In the experiment in a specific W1P, the initial laser beam power $P_0$ between $t_{mb}$=0.3 s is selected according to the graphs in FIGS. 16 and 17.

In FIGS. 18 and 19, a stability diagram of the ALB-DWD process in a $P_s$-WIP plane is illustrated at wire feed $v_w$=10 mm/s and 20 mm/s, and the insides of a dashed line and a two-dot chain line represent the stability region of the process. A black circle and a white square in the stability region represent the stable process at workpiece feeding speed $v_{wp}$=5 and 10 mm/s.

From the stability diagram at wire feeding $v_w$=10 mm/s, it can be seen that the lower-side stability boundary required for the stable process and the related minimum laser beam power $P_{s,min}$(WIP), and the higher-side stability boundary, the related maximum laser beam power $P_{s,max}$(WIP) increase non-linearly with increasing WIP. In this context, a laser beam power stability interval ($P_{s,min}$, $P_{s,max}$) increases until WIP=96% after applied $P_{s,max}$ reaches the laser-source maximum output power of 2.5 kW.

In addition to the stable region, non-stable regions of two qualitatively different DWD processes may be observed. At the lower WIP and laser beam power $P_s$>$P_{s,max}$, the process becomes unstable due to excessively high energy input to the wire end, causing breakdown of the molten bond and the formation of the pendent droplet.

At the higher WIP value and lower laser beam power $P_s$<$P_{s,min}$, the instability occurs due to too low energy input to the wire end, causing the collision of the wire and the workpiece. Furthermore, the stability region indicated by the white square decreases with increasing workpiece feeding speed to $v_{wp}$=10 mm/s. Related minimum required laser beam power $P_{s,min}$ increases and the width of maximum laser beam power $P_{s,max}$ and a related stability interval ($P_{s,min}$, $P_{s,max}$) decreases.

As illustrated in FIG. 19, the qualitative characteristic of the stability diagram is illustrated at higher wire feeding speed $v_w$=20 mm/s. However, quantitatively, the process stability may be achieved even in the lower WIPs. Furthermore, minimum laser beam power $P_{s,min}$ and maximum laser beam power $P_{s,max}$, and the width of stability interval ($P_{s,min}$, $P_{s,max}$) of the laser beam power increase.

In all considered and observed cases, the non-linear increase in $P_{s,min}$ (WIP) may be related to the fact that with increasing WIP, a higher portion of the laser beam energy is introduced into the workpiece, and thus the higher laser beam power is required to achieve the required wire end melting for the establishment of the molten bond. Furthermore, the reduction of the observed stability region and related interval ($P_{s,min}$, $P_{s,max}$) with increasing workpiece feeding speed $v_{wp}$ can be explained by the fact that with increasing $v_{wp}$, the higher laser beam power $P_{s,min}$ is required for the formation of the melt pool.

On the other hand, the observed decrease in $P_{s,max}$ is probably related to the additional heating of the wire by the laser beam reflected from the generated melt pool, resulting in the process instability due to the formation of the pendent droplet at lower $P_s$.

Figure 20:
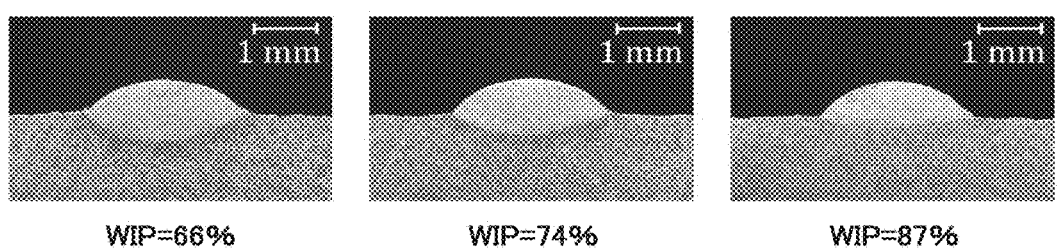
FIG. 20 is a diagram illustrating an influence of the WIP on a sectional shape of a deposition layer at $P_s$=1.1 kW.
Figure 21:
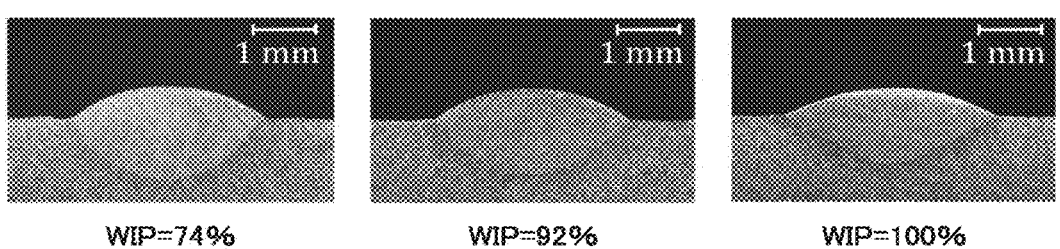
FIG. 21 is a diagram illustrating the influence of the WIP on the sectional shape of the deposition layer at $P_s$=1.8 kW.

FIG. 20 is a diagram illustrating an influence of the WIP on a sectional shape of a deposition layer at $P_s$=1.1 kW. FIG. 21 is a diagram illustrating the influence of the WIP on the sectional shape of the deposition layer at $P_s$=1.8 kW.

In order to indicate the influence of a geometric characteristic of the deposition layer and dilution of WIP, a selected example of a layer section is illustrated in FIG. 20 using wire feeding speed $v_w$=20 mm/s, workpiece feeding speed $v_{wp}$=5 mm/s, laser beam power $P_s$=1.1 kW, WIP=66, 74, and 87%. FIG. 21 illustrates a selected example of the layer cross section with wire feeding speed $v_w$=20 mm/s, workpiece feeding speed $v_{wp}$=5 mm/s, laser beam power $P_s$=1.8 kW, WIP=74, 92, and 100%.

Results and Discussion

Focusing on the initial transition phase of the process, the stability of the annular laser beam direct wire deposition (ALB-DWD) process is considered. The three different initial phase policies are investigated with respect to the initial wire end position, namely, above or on the workpiece surface. The experiment related to the single layer deposition of 0.6 mm diameter SS316 wire on SS304 workpiece were characterized by the melt pool temperature and the process visualization.

The results generally indicates that regardless of the initial policy used for the ALB-DWD process, the reason for the stability of the process is inadequate energy input into the workpiece and wire, whereby the collision of the wire end and the workpiece, or the destruction of the established molten bond and the formation of the pendent droplet in the wire end are caused. Using the initial policy in which the initial wire end position is set to the workpiece surface, the workpiece surface can be simultaneously heated with a reset ratio defined by the workpiece-wire irradiation ratio (WIP) as well as the workpiece and the wire. In this policy, an earliest and reliable transition to the stable steady phase of the process may be achieved.

In addition, the results of the process stability and the sectional analysis of the deposition layers indicate that, in addition to the general process parameters, the WIP significantly affects the process stability and its robustness as well as the geometric characteristic, mainly the dilution of the deposition layer.

Description of Configuration and Operation and Effect of Processing Machine in Embodiment Hereinafter, the configuration of the processing machine according to the present embodiment based on the contents of the above examination and the effects thereof will be described.

Figure 22:
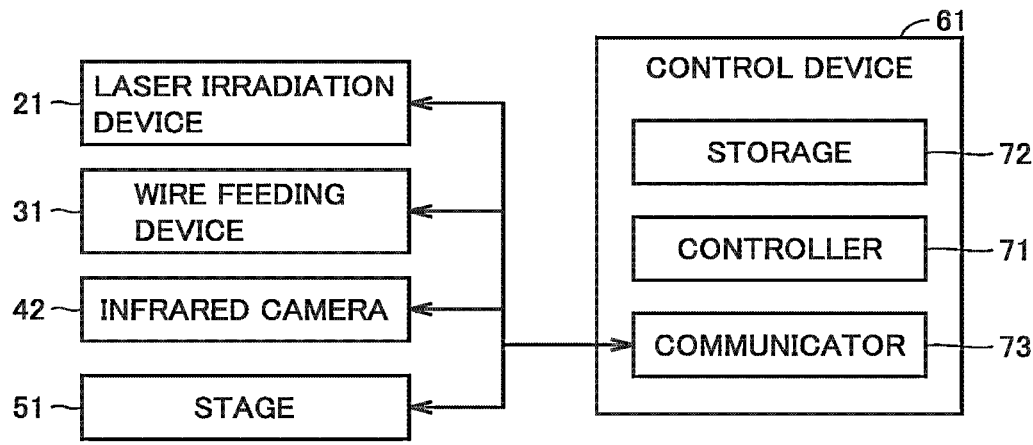
FIG. 22 is a block diagram illustrating a configuration of a processing machine according to an embodiment.

FIG. 22 is a block diagram illustrating the configuration of the processing machine of the embodiment. Referring to FIGS. 1 and 22, a processing machine 10 of the embodiment is a processing machine capable of performing additive manufacturing (AM) of the workpiece. The additive manufacturing is a machining method for producing a three-dimensional shape on a workpiece by attaching a material, and a mass of the workpiece increases before and after the additive manufacturing.

Processing machine 10 is a numerically control (NC) processing machine in which various operations for workpiece processing are automated by numerical control of a computer.

Processing machine 10 may be an AM/SM hybrid processing machine capable of performing additive manufacturing of the workpiece and subtractive manufacturing (SM) of the workpiece, or may be a processing machine capable of performing only the additive manufacturing of the workpiece.

Processing machine 10 performs the additive manufacturing of a workpiece WP by the ALB-DWD (Annular laser beam direct wire deposition) process using an ALB-DWD head 20.

Processing machine 10 includes a laser irradiation device 21 and wire feeding device 31. Laser irradiation device 21 irradiates workpiece WP with an annular laser beam L. Wire feeding device 31 feeds a wire W from the inside of annular laser beam L emitted from laser irradiation device 21 toward workpiece WP.

Laser irradiation device 21 includes a laser beam source (not illustrated), beam forming unit 22, reflection mirrors 23, 24, and focusing optical component 25.

The laser beam source is provided separately from ALB-DWD head 20. The laser beam source oscillates the laser beam used for the additive manufacturing. The laser beam source oscillates the laser beam with predetermined power (kw) based on a command from a control device 61 (described later). The laser beam oscillated by the laser beam source is guided to ALB-DWD head 20 through an optical fiber (not illustrated).

The laser beam made of parallel light along a center axis 101 is input to beam forming unit 22. Beam forming unit 22 forms the input laser beam into an annular shape (ring shape). For example, beam forming unit 22 includes a pair of axicon lenses disposed to face each other in an axial direction of center axis 101 and a convex lens disposed between the pair of axicon lenses.

The laser beam output from beam forming unit 22 has the annular shape, namely, a shape that circulates in an annular shape around center axis 101 when the laser beam is cut by a plane orthogonal to a traveling direction of the laser beam. The laser beam output from beam forming unit 22 has a circular ring shape centered on center axis 101.

Reflection mirror 23 and reflection mirror 24 are arranged in this order from an upstream side to a downstream side in the traveling direction of the laser beam in ALB-DWD head 20. Reflection mirror 23 is provided on the axis of center axis 101. Reflection mirror 23 is inclined by 45° with respect to center axis 101. Reflection mirror 24 is provided on an axis of a center axis 102 parallel to center axis 101. Reflection mirror 24 is inclined by 45° with respect to center axis 102.

Reflection mirror 23 reflects the annular laser beam output from beam forming unit 22, thereby directing the annular laser beam toward reflection mirror 24. Reflection mirror 24 reflects the annular laser beam from reflection mirror 23, thereby directing the annular laser beam toward optical component 25. The annular laser beam traveling from reflection mirror 23 toward optical component 25 travels in an axial direction of center axis 102 around center axis 102.

Optical component 25 includes at least one condenser lens. Optical component 25 emits the annular laser beam toward workpiece WP while condensing the annular laser beam. An annular laser beam L emitted from optical component 25 travels in the axial direction of center axis 102 around center axis 102, and the surface of workpiece WP is irradiated with the annular laser beam L.

Wire feeding device (wire feeding unit) 31 includes a spool 32, a wire straightener 33, a wire feeder 34, and a wire guide tube 27.

Spool 32 is formed of a cylindrical body. Wire W serving as a material for additive manufacturing is wound around spool 32. Wire straightener 33 includes a plurality of rotation rollers linearly arranged on both sides of wire W. When wire W drawn out from spool 32 passes through wire straightener 33, waviness of wire W is eliminated.

Wire feeder 34 is provided between wire straightener 33 and wire guide tube 27 in a feeding direction of wire W. Wire feeder 34 includes drive rollers disposed on both sides of wire W. Wire feeder 34 feeds wire W toward workpiece WP when the drive rollers are rotationally driven. Wire feeder 34 feeds wire W at a predetermined feeding speed based on a command from control device 61 (described later).

Wire guide tube 27 has a tubular shape. Wire guide tube 27 extends linearly on the axis of center axis 102. Wire guide tube 27 penetrates reflection mirror 24 and various lenses in optical component 25, and extends toward the surface of workpiece WP. Wire W is inserted into wire guide tube 27, thereby being guided from wire feeder 34 toward workpiece WP.

A tip of wire guide tube 27 is disposed inside annular laser beam L emitted from optical component 25 to workpiece WP.

Wire W from wire guide tube 27 goes to workpiece WP through the inside of annular laser beam L emitted from optical component 25 to workpiece WP. Wire W from wire guide tube 27 passes on the axis of the center axis 102, and goes to workpiece WP. The feeding of wire W toward workpiece WP and the irradiation of annular laser beam L toward workpiece WP are in a coaxial relationship.

Processing machine 10 further includes a gas nozzle 26. Gas nozzle 26 extends in a tubular shape from optical component 25 toward workpiece WP. Gas nozzle 26 has a tapered cylindrical shape in which a diameter decreases toward workpiece WP. Gas nozzle 26 is provided so as to surround wire W sent toward workpiece WP and annular laser beam L emitted toward workpiece WP around the axis of center axis 102. An inert gas G such as an Ar gas injected from gas nozzle 26 blocks between a machining point of the additive manufacturing in workpiece WP and an external atmosphere.

Processing machine 10 includes a workpiece moving stage 51. Workpiece moving stage 51 is provided as a moving mechanism unit that moves workpiece WP with respect to laser irradiation device 21.

Workpiece moving stage 51 includes a clamp 53. Clamp 53 has a claw portion, and is configured to be able to clamp workpiece WP by the claw portion. Workpiece moving stage 51 slides workpiece WP clamped by clamp 53 in a horizontal plane by various feeding mechanisms, guide mechanisms, servomotors, and the like. Workpiece moving stage 51 slides workpiece WP in a plane orthogonal to center axis 102.

Workpiece moving stage 51 moves workpiece WP at a predetermined feeding speed based on a command from control device 61 (described later).

The moving mechanism that moves laser irradiation device 21 and workpiece WP relative to each other is not limited to the above configuration. For example, ALB-DWD head 20 on which laser irradiation device 21 is mounted may be spatially moved with respect to workpiece WP, or a combination of workpiece moving stage 51 and the configuration for moving spatially ALB-DWD head 20 may be used. The direction (in the embodiment, a horizontal direction) in which laser irradiation device 21 and workpiece WP move relative to each other and the irradiation direction (in the embodiment, a vertical direction) of the annular laser beam from laser irradiation device 21 to workpiece WP have an orthogonal relationship. The direction (in the embodiment, the horizontal direction) in which laser irradiation device 21 and workpiece WP move relative to each other and the feeding direction (in the embodiment, the vertical direction) of wire W from wire feeding device 31 to workpiece WP have an orthogonal relationship.

Processing machine 10 further includes infrared camera 42. Infrared camera 42 observes the surface of workpiece WP. Infrared camera 42 visualizes infrared rays radiated from the workpiece WP with irradiation of the annular laser beam toward the workpiece WP as an infrared image.

Processing machine 10 further includes control device 61 that controls processing machine 10. More specifically, control device 61 controls the laser beam source in the laser irradiation device 21, the wire feeder 34 in the wire feeding device 31, the infrared camera 42, and the workpiece moving stage 51.

Referring to FIGS. 4, 14, and 22, in the embodiment, control device 61 executes the ALB-DWD process according to policy C.

Control device 61 controls the wire feeding device 31 so that the wire end abuts on the surface of workpiece WP at a beginning of the additive manufacturing. At the beginning of the additive manufacturing, control device 61 determines initial power $P_0$ of the laser beam based on the WIP (Workpiece irradiation proportion parameter) and controls laser irradiation device 21 to irradiate workpiece WP with the laser beam at initial power $P_0$.

Control device 61 includes a storage 72, a controller 71, and a communicator 73. Storage 72 stores data related to the relationship between the WIP and initial power $P_0$ of the laser beam to be set. Controller 71 determines initial power $P_0$ of the laser beam by comparing the WIP at the beginning of the additive manufacturing to the data stored in storage 72. Communicator 73 communicates initial power $P_0$ of the laser beam determined by controller 71 to laser irradiation device 21.

As described above, when the wire end is brought into contact with the workpiece surface at the beginning of the additive manufacturing, the value of the laser beam power $P_0$ depends only on the WIP. Based on such finding, FIG. 16 illustrates, as an example of data stored in storage 72, a relationship between the WIP and the range of the initial power $P_0$ of the laser beam (the range of a hatched region between the dashed line and the two-dot chain line in the vertical axis direction) in which the initial phase of the ALB-DWD process is stably executed.

Referring to FIG. 16, when the initial power $P_0$ of the laser beam is in the range above the dashed line, the energy input to the workpiece is too large, so that the pendant droplet is formed as illustrated in FIG. 11. When the initial power $P_0$ of the laser beam is in the range below the two-dot chain line, the energy input to the workpiece is too small, so that the collision between the wire end and the workpiece surface occurs as illustrated in FIG. 10.

When the initial power $P_0$ of the laser beam is set to the range between the dashed line and the two-dot chain line, as illustrated in FIG. 9, the molten bond in an appropriate form can be formed between the workpiece surface and the wire end.

The case where the value of the WIP is large corresponds to the case where the value of $h_{wp}$ in FIG. 2 is large (the case where the workpiece surface is far from the focal position of the laser beam). As the diameter (beam diameter) of the irradiation region of the laser beam on the workpiece surface increases, the ratio of the energy input to the wire decreases, and the ratio of the energy input to the workpiece increases. In this case, the laser beam irradiation with the larger energy is required in forming the molten bond in the appropriate form between the workpiece surface and the wire end at the beginning of the additive manufacturing.

On the other hand, the case where the value of the WIP is small corresponds to the case where the value of $h_{wp}$ in FIG. 2 is small (the case where the distance from the focal position of the laser beam to the workpiece surface is close). As the diameter (beam diameter) of the irradiation region of the laser beam on the workpiece surface decreases, the ratio of the energy input to the wire increases, and the ratio of the energy input to the workpiece decreases. In this case, the laser beam irradiation with the smaller energy is required in forming the molten bond in the appropriate form between the workpiece surface and the wire end at the beginning of the additive manufacturing.

Figure 23:
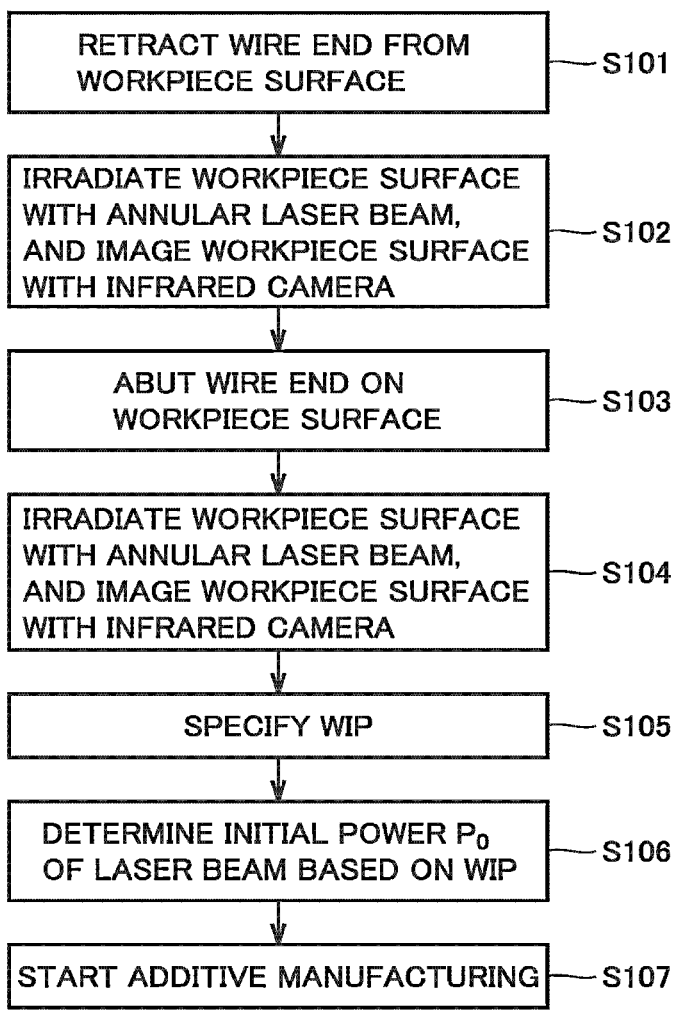
FIG. 23 is a flowchart illustrating a step for specifying the initial power $P_0$ of laser beam.

FIG. 23 is a flowchart illustrating a step for specifying initial laser beam power $P_0$.

Referring to FIGS. 22 and 23, control device 61 controls wire feeding device 31 so that the wire end is positioned while retracted from the workpiece surface (S101). The state in which the wire does not exist in the irradiation region of the laser beam is obtained by this step.

Then, control device 61 controls laser irradiation device 21 so that the workpiece is irradiated with the annular laser beam. Control device 61 controls infrared camera 42 so that the workpiece surface irradiated with the annular laser beam is imaged (S102).

An infrared image on the workpiece surface in the state where the wire does not exist in the irradiation region of the laser beam is obtained by this step. Data of the obtained infrared image is transmitted to communicator 73 in control device 61.

Then, control device 61 controls wire feeding device 31 so that the wire end abuts on the workpiece surface (S103) The state in which the wire exists in the irradiation region of the laser beam is obtained by this step.

Then, control device 61 controls laser irradiation device 21 so that the workpiece is irradiated with the annular laser beam. Control device 61 controls infrared camera 42 so that the workpiece surface irradiated with the annular laser beam is imaged (S104).

The infrared image on the workpiece surface in the state where the wire exists in the irradiation region of the laser beam is obtained by this step. Data of the obtained infrared image is transmitted to communicator 73 in control device 61.

Then, control device 61 specifies the WIP (S105) Specifically, control device 61 estimates laser beam power P introduced onto the workpiece surface when the wire does not exist in the irradiation region of the laser beam from the pixel value of the infrared image obtained in step S102. Control device 61 estimates laser beam power $P_{wp}$ introduced onto the workpiece surface when the wire exists in the irradiation region of the laser beam from the pixel value of the infrared image obtained in step S104. Control device 61 calculates the WIP (=$P_{wp}$/P) using the estimated values of laser beam power P and laser beam power $P_{wp}$.

In the embodiment, the case where the value of the WIP is specified based on the pixel value of the infrared image on the workpiece surface is described, but the present invention is not limited thereto. For example, the value of the WIP may be theoretically calculated using equation (1) in the item of [Investigation of Initial Transition Phase and Stability of ALB-DWD] described above.

Then, control device 61 determines initial output $P_0$ of the laser beam based on the value of the WIP specified in the previous step (S106). In this step, controller 71 in control device 61 determines initial power $P_0$ of the laser beam by comparing the WIP specified in the previous step to the data stored in storage 72.

Then, control device 61 controls laser irradiation device 21 so as to start the additive manufacturing with initial output $P_0$ of the laser beam determined in the previous step (S107). Consequently, workpiece WP is irradiated with the annular laser beam at initial power $P_0$ while the wire end abut on the surface of workpiece WP, and the additive manufacturing is started.

In the embodiment, initial power $P_0$ of the laser beam is determined based on the WIP at the beginning of the additive manufacturing, whereby the molten bond in the appropriate form can be formed between the workpiece surface and the wire end. In addition, the workpiece and the wire are simultaneously heated by the laser beam by bringing the wire end into contact with the workpiece surface at the beginning of the additive manufacturing. Because of this, the melt pool on the workpiece surface and the molten bond between the workpiece surface and the wire end can be generated in a short time. For these reasons, the stability of the ALB-DWD process can be enhanced in the initial phase at the beginning of the additive manufacturing.

After S107, control device 61 controls laser irradiation device 21, wire feeding device 31, and workpiece moving stage 51 so that the ALB-DWD process is performed according to the condition (laser beam power, wire feeding speed, and workpiece feeding speed) of policy C in FIG. 14.

Specifically, control device 61 controls laser irradiation device 21 so that the power of the laser beam increases to power $P_S$ larger than initial power $P_0$ after the laser beam irradiation is continued with initial power $P_0$ for a certain period of time. Control device 61 controls wire feeding device 31 so that starts the feeding of the wire toward the workpiece at the same time when the power of the laser beam starts the increase from initial power $P_0$. Control device 61 controls workpiece moving stage 51 so that the workpiece starts to move while the power of the laser beam increases from initial power $P_0$ to power $P_S$.

According to such a configuration, the ALB-DWD process can be stably transitioned from the initial phase at the beginning of the additive manufacturing to the steady phase in which the additive manufacturing is continuously performed to the workpiece.

The values of the laser beam power, the wire feeding speed, and the workpiece feeding speed in FIG. 14 are merely examples, and are not particularly limited in the present invention.

It should be considered that the disclosed embodiment is an example in all respects and not restrictive. The scope of the present invention is defined by not the description above, but the claims, and it is intended that all modifications within the meaning and scope of the claims and their equivalents are included in the present invention.

INDUSTRIAL APPLICABILITY

The present invention is applied to a processing machine capable of performing additive manufacturing.

REFERENCE SIGNS LIST

10: processing machine, 20: ALB-DWD head, 21: laser irradiation device, 22: beam forming unit, 23, 24: reflection mirror, 25: optical component, 26: gas nozzle, 27: wire guide tube, 28: two-color in-axis pyrometer, 31: wire feeding device, 32: spool, 33: wire straightener, 34: wire feeder, 41: process monitoring system, 42: infrared camera, 43: vision camera, 44: laser distance sensor, 51: workpiece moving stage, 53: clamp, 61: control device, 71: controller, 72: storage, 73: communicator, 101, 102: center axis

The invention claimed is:

1. A processing machine that performs additive manufacturing, the processing machine comprising:
   a laser irradiation device configured to irradiate a workpiece with an annular laser beam;
   a wire feeding device configured to feed a wire from an inside of the annular laser beam emitted from the laser irradiation device toward the workpiece; and
   a control device configured to control the processing machine,
   wherein when a workpiece irradiation proportion parameter (WIP) represented by a following equation is defined, $$WIP = P_{wp}/P$$

wherein $P_{wp}$ is laser beam power introduced onto a workpiece surface when the wire exists in an irradiation region of a laser beam and P is laser beam power introduced onto the workpiece surface when the wire does not exist in the irradiation region of the laser beam at a beginning of the additive manufacturing, the control device controls the wire feeding device so that a wire end abuts on the workpiece surface, determines initial power $P_0$ of the laser beam based on the WIP, and controls the laser irradiation device so that the workpiece is irradiated with the laser beam at the initial power $P_0$.

2. The processing machine according to claim 1, wherein the control device includes:

a storage configured to store data related to a relationship between the WIP and the initial power $P_0$ of the laser beam to be set;

a controller configured to determine the initial power $P_0$ of the laser beam by comparing the WIP at the beginning of the additive manufacturing to the data stored in the storage; and a communicator configured to communicate the initial power $P_0$ of the laser beam determined by the controller to the laser irradiation device.

3. The processing machine according to claim 2, further comprising an infrared camera configured to observe the workpiece surface, wherein the controller specifies the WIP by estimating the laser beam power introduced onto the workpiece surface from a pixel value of an infrared image obtained by the infrared camera.

4. The processing machine according to claim 1, wherein the control device controls the laser irradiation device so that the power of the laser beam increases to power $P_S$ larger than the initial power $P_0$ after the irradiation of the laser beam is continued for a certain period of time with the initial power $P_0$.

5. The processing machine according to claim 4, wherein the control device controls the wire feeding device so that wire feeding is started toward the workpiece at an identical time when the power of the laser beam starts the increase from the initial power $P_0$.

6. The processing machine according to claim 4, further comprising a moving mechanism configured to move the laser irradiation device and the workpiece relative to each other, wherein the control device controls the moving mechanism so that the laser irradiation device and the workpiece start to move relative to each other while the power of the laser beam increases from the initial power $P_0$ to the power $P_S$.

* * * * *